April 12, 1932. A. M. SCHLAEGEL 1,853,701
SEMITRAILER HITCH
Filed March 1, 1927 2 Sheets-Sheet 1

INVENTOR.
ALFRED M. SCHLAEGEL
BY Ely Barrow
ATTORNEY.

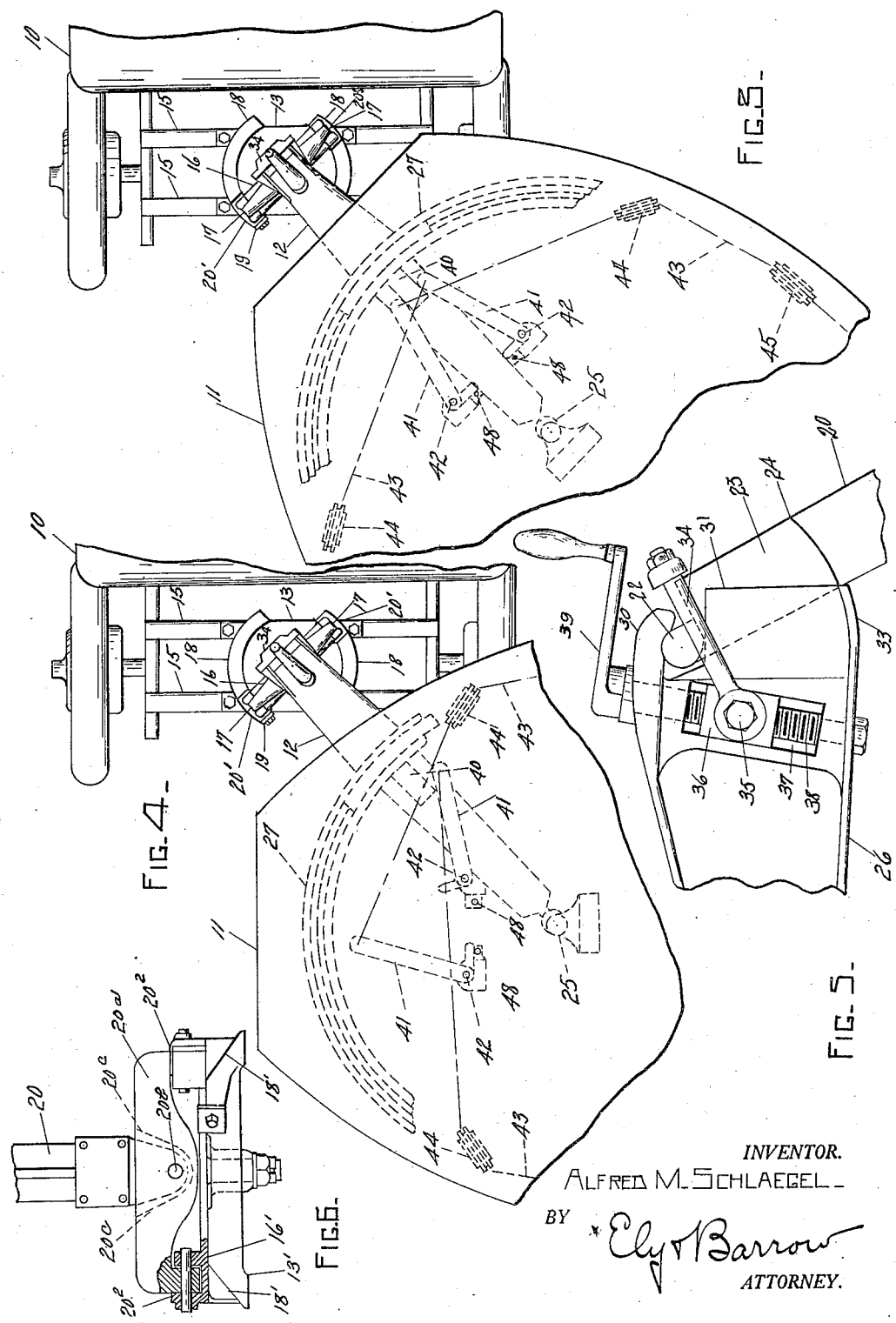

Patented Apr. 12, 1932

1,853,701

UNITED STATES PATENT OFFICE

ALFRED M. SCHLAEGEL, OF BARBERTON, OHIO

SEMITRAILER HITCH

Application filed March 1, 1927. Serial No. 171,760.

This invention relates to hitches for semi-trailers for use with trucks or passenger vehicles for hauling or touring purposes.

The general purpose of the invention is to provide an improved hitch for semi-trailers adapted to facilitate easy attachment of the trailer to the driven vehicle and easy handling of the vehicle and trailer.

Particularly the invention has for one object the provision of an improved hitch comprising interlocking members adapted to be engaged and locked together in a simple, effective way.

Another object of the invention is to provide in a hitch for trailers means providing a double pivotal action between the vehicle and trailer, these actions being effective progressively in such a way as to permit a close connection between the vehicle and trailer while at the same time permitting the trailer to swing clear of the vehicle especially for short turns, and also facilitating handling and particularly backing of the trailer by the vehicle into any desired position.

The foregoing and other objects of the invention are obtained by the construction illustrated in the accompanying drawings. It is to be understood that the invention is not limited to the specific form thereof shown and described.

Of the accompanying drawings:

Figure 3 is a plan thereof illustrating the hitch at the limit of its first pivotal movement;

Figure 4 is a plan thereof illustrating the hitch in a position in which both pivotal movements are brought into play;

Figure 5 is a detail illustrating the manner of making interlocking connection between the members of the hitch; and Figure 6 is a detail view illustrating a modified form of mounting for the hitch member on the driven vehicle.

Figure 1:
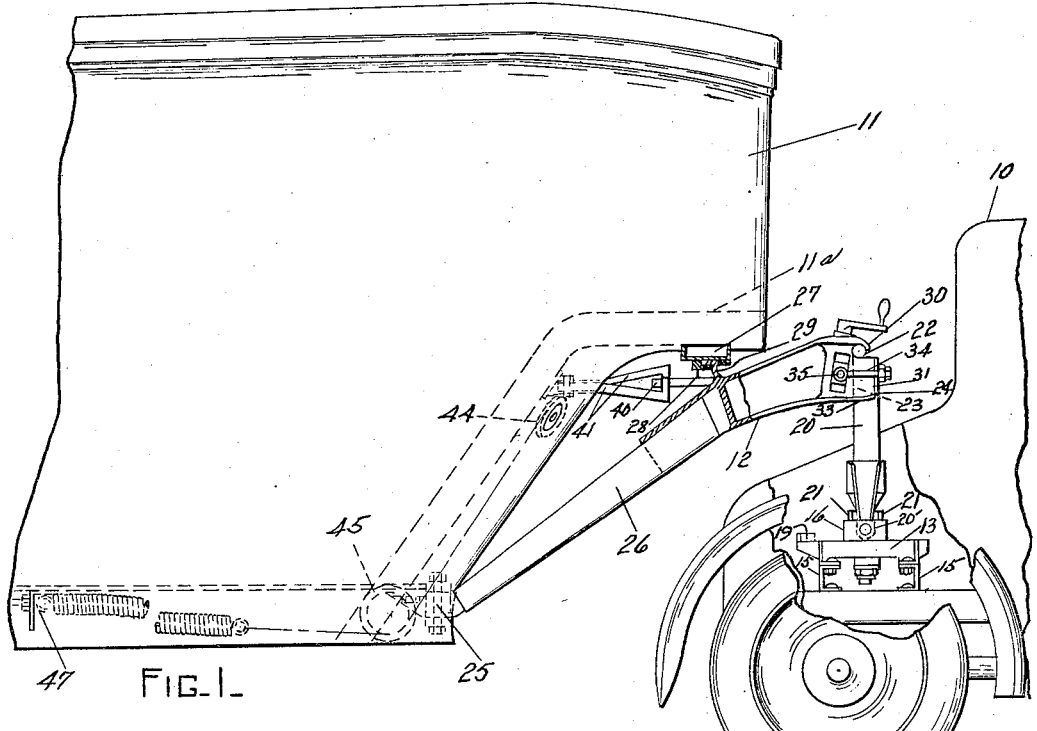
Figure 1 is a side elevation illustrating the improved trailer hitch in operative position between a vehicle and a semi-trailer.
Figure 2:
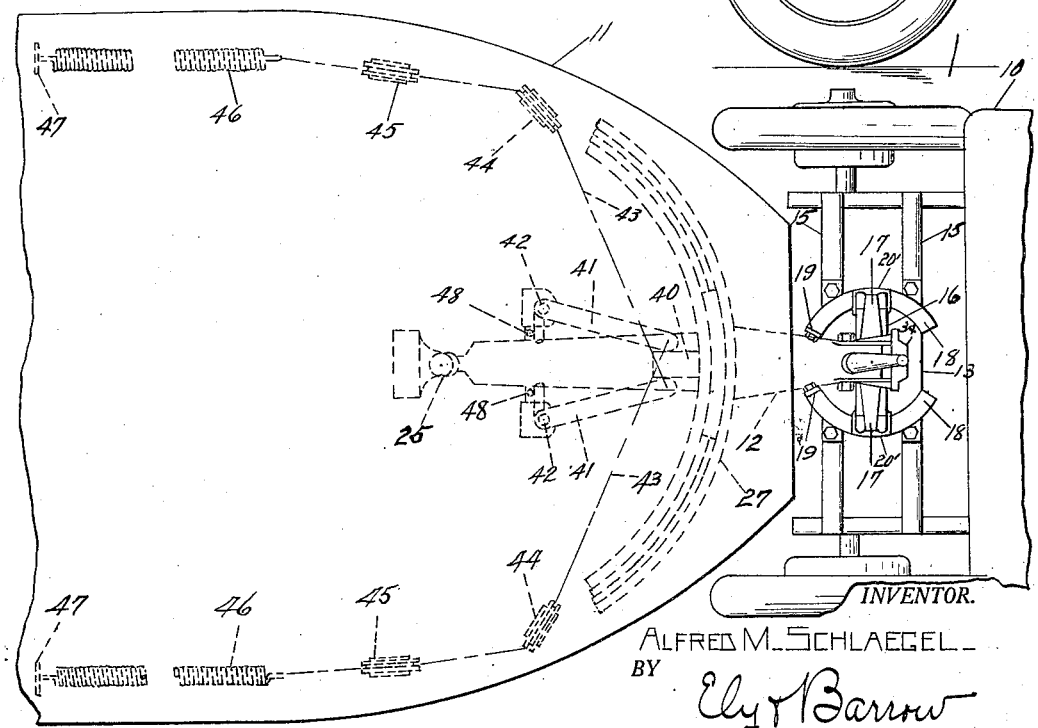
Figure 2 is a plan thereof illustrating the hitch in normal operation.

Referring to the drawings, the numeral 10 designates a driven vehicle such as a passenger coupé, and the numeral 11 a semi-trailer, for example, carrying a touring outfit including kitchen, sleeping quarters, etc. The improved hitch is indicated generally by the numeral 12.

The hitch 12 includes two members, one attached to vehicle 10 and the other to the semi-trailer 11 and adapted to be releasably interlocked with each other as will be described.

The member of hitch 12 connected with vehicle 10 includes a base 13 mounted on the floor of vehicle 10, preferably on channels 15 secured to said floor. Swiveled onto base 13 is an element 16 formed with lateral extensions 17, 17 riding on curved tracks 18, 18 on base 13, this construction providing the pivot on which the hitch first swings in operation, the pivotal action of which is limited in each direction to substantially forty-five degrees (45°) by means of stops 19, 19 on tracks 18 with which extensions 17 will engage. Hinged on element 16 at 20', 20' is an upright 20 capable of limited swinging in a vertical plane to small angles with respect to the vertical, in which positions it is limited by abutments 21, 21 on element 16.

In Figure 6 a modified form of mounting for upright 20 on the driven vehicle 11 is shown. In this form the base 13' has swiveled thereon the element 16' tracking thereon at 18', 18'. A second element $20^a$ has the upright hinged thereon at $20^b$ for lateral rocking movement, this movement being limited by abutments $20^c$, $20^c$, element $20^a$ being hinged on element 16' at $20^2$, $20^2$.

The upright 20 is formed with a rounded projection 22 on its upper end and with a widened portion 23 extending downwardly therefrom and terminating in shoulders at 24 on each side thereof which curve forwardly and upwardly, the projection 22 and shoulders 24 providing means by which the member of the hitch on the semi-trailer can be releasably interlocked therewith as will be explained.

Pivoted at 25 on the trailer 11 and curving forwardly and upwardly therefrom in a space provided by elevating the bottom of a trailer 11 at $11^a$ is a link 26 supported by a curved track 27 secured on the bottom portion 11ᵃ of the trailer and having an undercut rail 28 on which a supporting member 29, connected to link 26, rides to suspend the link 26 beneath the trailer.

To connect link 26 to upright 20, the free end of the link is formed with an upper downwardly curved hook portion 30 for engaging over the rounded protection 22, side members 31, 31 for embracing portion 23 of the upright 20 and lower upwardly curved prongs 33, 33 for engaging under shoulders 24 of upright 20. To secure the link 26 and 20 in locked relationship, a yoke 34 is pivoted at 35 on a slide block 36 arranged in a slot 37 in link 26 and is adapted to be extended about upright 20, the slot 37 being directed at an angle as shown so as to tighten the yoke 34 onto upright 20 by downward operation of the slide block 36. To operate the slide block, a screw 38 is journaled in the link and threaded through the block and has an operating crank 39 thereon.

To the end that link 26 will normally be prevented from swinging on pivot 25, an extension 40 thereon is arranged to project between two levers 41, 41 pivoted at 42, 42 on the bottom of the trailer and yieldingly urged against the sides of extension 40 by flexible connectors 43, 43 extended over pulleys 44, 44 and 45, 45 and connected to tensile springs 46, 46 secured to the chassis of the trailer at 47, 47, action of the springs 46 on levers 41 being limited by stops at 48, 48.

In use, relative horizontal movement of the trailer 11 with respect to the driven vehicle 10 up to substantially forty-five degrees in either direction from a position in alignment takes place about the pivotal connection to the vehicle 10 at 16. Further relative horizontal movement to greater angles in either direction takes place about pivot 25, springs 46 yielding under this action. Relative vertical movement longitudinally or in the line of force between the vehicle and the trailer, as when going over the crest of a hill or the like, takes place about the hinges 20′ or 20², and in the form of mounting shown in Figure 6, relative lateral rocking movement takes place about pivot 20ᵇ. The manner of making or breaking the connection between vehicle and trailer will be readily understood, the parts being brought together or moved apart at an angle as shown in Figure 5, which is provided for by pivots 20′ or 20².

Modifications of the invention may be resorted to without departing from the spirit thereof or the scope of the appended claims.

What is claimed is:

1. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action and also for lateral vertical rocking movement, an upwardly extending, rounded projection on the upper end of the upright, said upright being enlarged at its upper end to define forwardly extending, upwardly curved shoulders thereon, a semi-trailer having a link pivoted thereon for horizontal swinging movement, a track on the trailer and means on the link engaging the track to suspend the free end of the link from the trailer, a downwardly curved, hook-like element on the free end of the link for engaging over said rounded projection, side elements on the free end of the link for embracing the enlarged upper end of the upright, upwardly curved, forwardly extending prongs on the bottom of the free end of the link for engaging under said shoulders on said upright, the free end of the link having a slot therein, a slide block in the slot, a yoke pivoted on the slide block for embracing the upper end of the upright, said block being adjustable to tighten said yoke on said upright, an extension on the link, levers pivoted on the trailer, and yielding means urging the levers against opposite sides of the extension normally to prevent pivotal action of the link with respect to the trailer but adapted to yield to permit such action when said swiveled element engages said stops.

2. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardy extending, rounded projection on the upper end of the upright, said upright being enlarged at its upper end to define forwardly extending, upwardly curved shoulders thereon, a semi-trailer having a link pivoted thereon for horizontal swinging movement, a track on the trailer and means on the link engaging the track to suspend the free end of the link from the trailer, a downwardly curved, hook-like element on the free end of the link for engaging over said rounded projection, side elements on the free end of the link for embracing the enlarged upper end of the upright, upwardly curved, forwardly extending prongs on the bottom of the free end of the link for engaging under said shoulders on said upright, the free end of the link having a slot therein, a slide block in the slot, a yoke pivoted on the slide block for embracing the upper end of the upright, said block being adjustable to tighten said yoke on said upright, an extension on the link, and yielding means effective against opposite sides of the extension normally to prevent pivotal action of the link with respect to the trailer but adapted to yield to permit such action when said swiveled element engages said stops.

3. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardly extending, rounded projection on the upper end of the upright, said upright being enlarged at its upper end to define forwardly extending, upwardly curved shoulders thereon, a semi-trailer having a link pivoted thereon for horizontal swinging movement, a track on the trailer and means on the link engaging the track to suspend the free end of the link from the trailer, interlocking means on the upper end of the upright and the free end of the link for releasably locking these elements together, an extension on the link, and yielding means effective against opposite sides of the extension normally to prevent pivotal action of the link with respect to the trailer but adapted to yield to permit such action when said swiveled element engages said stops.

4. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardly extending, rounded projection on the upper end of the upright, said upright being enlarged at its upper end to define forwardly extending, upwardly curved shoulders thereon, a semi-trailer having a link pivoted thereon for horizontal swinging movement, interlocking means on the upper end of the upright and the free end of the link for releasably locking these elements together, an extension on the link, and yielding means effective against opposite sides of the extension normally to prevent pivotal action of the link with respect to the trailer but adapted to yield to permit such action when said swiveled element engages said stops.

5. A trailer hitch including a member adapted to be connected to a driven vehicle, a member connected to the trailer, and means on each member for releasably interlocking it with the other, said means including an upwardly extending portion on the first member formed with a rounded projection on its upper end and being enlarged adjacent said end to form forwardly extending upwardly curved shoulders, the second member having a forwardly extending portion formed with an upper downwardly curved hook member for engaging over said projection on the first member, side members for embracing the enlarged portion of the first member and upwardly curved prongs for engaging under the shoulders on said first member and means for securing said members in interlocked relationship.

6. A trailer hitch including a member adapted to be connected to a driven vehicle, a member connected to the trailer, and means on each member for releasably interlocking it with the other said means including an upwardly extending portion on the first member formed with a rounded projection on its upper end and being enlarged adjacent said end to form forwardly extending upwardly curved shoulders, the second member having a forwardly extending portion formed with an upper downwardly curved hook member for engaging over said projection on the first member, upwardly curved prongs for engaging under the shoulders on said first member and means for securing said members in interlocked relationship.

7. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardly extending, rounded projection on the upper end of the upright, said upright being enlarged at its upper end to define forwardly extending, upwardly curved shoulders thereon, a semi-trailer having a link pivoted thereon for horizontal swinging movement, a downwardly curved, hook-like element on the free end of the link for engaging over said rounded projection, side elements on the free end of the link for embracing the enlarged upper end of the upright, upwardly curved, forwardly extending prongs on the bottom of the free end of the link for engaging under said shoulders on said upright, the free end of the link having a slot therein, a slide block in the slot, and a yoke pivoted on the slide block for embracing the upper end of the upright, said block being adjustable to tighten said yoke on said upright.

8. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardly extending, rounded projection on the upper end of the upright, said upright being enlarged at its upper end to define forwardly extending, upwardly curved shoulders thereon, a semi-trailer having a link pivoted thereon for horizontal swinging movement, a downwardly curved, hook-like element on the free end of the link for engaging over said rounded projection, the free end of the link having a slot therein, a slide block in the slot, and a yoke pivoted on the slide block for embracing the upper end of the upright, said block being adjustable to tighten said yoke on said upright.

9. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardly extending, rounded projection on the upper end of the upright, said upright being enlarged at its upper end to define forwardly extending, upwardly curved shoulders thereon, a semi-trailer having a link pivoted thereon for horizontal swinging movement, a downwardly curved, hook-like element on the free end of the link for engaging over said rounded projection, side elements on the free end of the link for embracing the enlarged upper end of the upright, upwardly curved, forwardly extending prongs on the bottom of the free end of the link for engaging under said shoulders on said upright, and means for releasably securing the upright and link in interlocking relationship.

10. A hitch for semi-trailers including an element adapted to be swiveled to a driven vehicle for horizontal pivotal action, stops for limiting said pivotal action to a predetermined amount in either direction from normal alignment, an upright hinged onto said element for longitudinal vertical pivotal action, an upwardly extending, rounded projection on the upper end of the upright, said upright being enlarged at its upper end to define forwardly extending, upwardly curved shoulders thereon, a semi-trailer having a link pivoted thereon for horizontal swinging movement, a downwardly curved, hook-like element on the free end of the link for engaging over said rounded projection, and means for releasably securing the upright and link in interlocking relationship.

11. A semi-trailer hitch including a member adapted to be attached to a driven vehicle, a member attached to the trailer, interlocking formations on said members for releasably securing them together, one of said members providing a socket and the other having a head engageable in said socket, one of said members being mounted for angular movement with respect to the other and said interlocking formation permitting interlocking of one formation with the other only by such angular movement, and means engageable with said socket and head members to retain them in interlocked relationship.

ALFRED M. SCHLAEGEL.